United States Patent Office

3,093,661
Patented June 11, 1963

3,093,661
PRODUCTION OF HIGH PURITY DIEPOXIDE
Robert W. Fourie, Houston, Kenneth B. Cofer, Pasadena, and Dwight M. Sheets, Houston, Tex., assignors to Shell Oil Company, New York, N.Y., a corporation of Delaware
No Drawing. Filed Mar. 14, 1960, Ser. No. 14,498
5 Claims. (Cl. 260—348)

This invention relates to an improved method for the production of free-flowing crystals of 2,2-bis(2,3-epoxypropoxyphenyl)propane.

The compound with which this invention is concerned, 2,2-bis(2,3-epoxypropoxyphenyl)propane, is produced by the reaction of epichlorohydrin with 2,2-bis(4-hydroxyphenyl)propane. The last-named phenolic compound is often referred to in industry as "p,p'-bisphenol A" or simply "bisphenol A"; these terms are at times used herein for convenience of reference. Similarly, the compound 2,2-bis(2,3-epoxypropoxyphenyl)propane can be conveniently designated "diglycidyl ether of bisphenol A."

The reaction of epichlorohydrin with bisphenol A to produce a complex mixture of polyglycidyl ethers of bisphenol A is well known. It is described in some detail, for example, in U.S. 2,467,171 to Werner et al. and in U.S. 2,651,589 to Shokal et al. The simplest addition product which is formed in this reaction is the 2:1 addition product, 2,2-bis(2,3-epoxypropoxyphenyl)propane, which can be represented by the formula

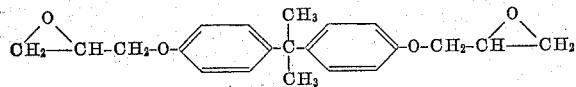

The higher molecular weight addition products which are also formed in the reaction have the general formula

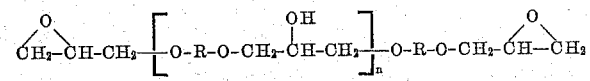

wherein $n$ is an integer and R represents the divalent hydrocarbon radical of the bisphenol. The simplest higher molecular weight product ($n=1$) is the 3:2 addition product of epichlorohydrin and bisphenol A. Still higher molecular weight products contain epichlorohydrin and bisphenol A residues in molar ratios of 4:3, 5:4 and the like. By appropriate control of the ratio of epichlorohydrin to bisphenol A in the reaction and of other reaction conditions, complex mixtures can be produced which contain a relatively high proportion of the diglycidyl ether of bisphenol A, e.g., 70 to 90% by weight or more of the total reaction product, the remainder being mainly the 3:2, 4:3 and higher addition products. However, no method has been described which permits production of the pure diglycidyl ether of bisphenol A directly by the reaction of epichlorohydrin with bisphenol A.

Attempts to produce the diglycidyl ether of bisphenol A had previously resulted only in the recovery of a relatively viscous liquid which still contained some undesirable impurities which affect adversely the utility of epoxy resins prepared therefrom for some special applications.

It has recently been found that the substantially pure diglycidyl ether of p,p'-bisphenol A is capable of existing in crystalline form and that it can be recovered in the form of free-flowing crystals from certain concentrates of the compound by use of controlled crystallization methods. A free-flowing solid is one which exists in the form of discrete relatively small particles which do not agglomerate into large masses and which can be readily poured from a container; examples are dry powder, dry sand, and the like. The substantially pure crystalline product is greatly superior in a number of ways to the less pure form of the compound hitherto known. The crystalline product has a substantially better color, higher epoxy content, lower total chlorine content, lower saponifiable chlorine content, lower total hydroxide content, and lower phenolic hydroxide content; it has a lower viscosity in its liquefied state. The fact that the pure diglycidyl ether of bisphenol A is a free-flowing solid permits it to be used with much greater convenience than the impure product, which exists only in liquid form. Some particularly advantageous applications of the resin are now possible for the first time.

The liquid condensation products of bisphenol A and epichlorohydrin, described in the above-mentioned patents to Werner et al. and Shokal et al., are materials of commerce with a variety of uses. They can be reacted with various known curing agents to produce hard, cross-linked resins, so-called epoxy resins, suitable for use in molding, potting, laminating, surface protection, and the like.

The crystalline products of this invention can be combined with the same curing agents and other ingredients to produce epoxy resins which are at least equal in quality to the resins produced from the liquid condensation products and are superior thereto in some respects, e.g., in their electrical properties.

Crystalline 2,2-bis(2,3-epoxypropoxyphenyl)propane can be recovered by cooling a relatively pure concentrate thereof free of added solvents for a prolonged period of time, but this is not a practical commercial method for producing the crystalline material. A major reason for difficulties in direct crystallization is that the liquid has a relatively high viscosity at the low temperatures required for crystallization and this prevents substantial thermal circulation which is required for easy crystal growth. Other reasons are that impurities usually tend to prevent crystallization and foster supercooling instead.

It was found that the diglycidyl ether of bisphenol A is soluble in many organic solvents and that many of these solutions are of suitably low viscosity in the temperature range required for crystallization, namely, between about 0° and 25° C. It was also found that, for a variety of reasons, many liquids which dissolve the diglycidyl ether of bisphenol A are not suitable in practical commercial methods of recovering the compound by crystallization. Some solvents are inadequate because the solubility of the diglycidyl ether of bisphenol A in them is so high even at relatively low temperatures that little of the compound can be crystallized therefrom. Solutions in other solvents, when cooled, produce not the crystals of the diglycidyl ether but a liquid phase which is essentially the supercooled liquid form of the diglycidyl ether of bisphenol A. It was found by others that certain solvents and mixtures of solvents in which the diglycidyl ether has moderate solubility are suitable for the crystallization process.

It has now been found that even the best solvents hitherto known have certain disadvantages in the recovery of crystalline diglycidyl ether of bisphenol A and that particularly outstanding results are surprisingly obtained when the solvent employed is a liquid vicinal monoepoxy compound having a viscosity of from 0.5 to 10 centipoises at 25° C. Particularly outstanding results are obtained with n-butyl monoglycidyl ether.

It is an object of this invention to provide an improved method for producing substantially pure 2,2-bis(2,3-epoxypropoxyphenyl) propane in the form of free-flowing crystals. It is a further object to provide a method of recovering crystalline 2,2-bis(2,3-epoxypropoxyphenyl)propane by an improved process comprising crystallization from a solution of a liquid concentrate thereof in monoepoxides of low viscosity. These and other objects of this invention will be better understood from the following description.

As described in copending application Serial No. 14,583 of Edward et al., filed March 14, 1960, the solvents which have been preferred for use in the crystallization of the diglycidyl ether of bisphenol A, e.g., mixtures of methyl isobutyl ketone and methyl isobutyl carbinol or mixtures of methyl isobutyl ketone and hexane, are used in such a manner that the solution which is chilled contains a major proportion of the solvent and a minor proportion, usually 40% or less, of the diglycidyl ether. In contrast thereto, the solvents of this invention are used in amounts of only from about 5 to about 20% by weight of the total crystallization mixture. It has been found that when the present solvents are used in higher concentrations the crystalline material is recovered in lower yield and the time required for crystallization is extended unduly. However, when crystallization is carried out in accordance with this invention, the recovery of crystals is higher than can be obtained with solvents used hitherto, the crystal purity is higher, the solvent requirement is lower, and the storage stability of the crystals in the solvent is greater.

The use of monoepoxy compounds in accordance with this invention permits a particularly preferred mode of operation in which a crude reaction product of bisphenol A and epichlorohydrin is converted in part into the pure crystalline diglycidyl ether of p,p'-bisphenol A and in part into a composition of diglycidyl and polyglycidyl ethers of bisphenol A containing a liquid monoepoxy compound; the latter composition is of special commercial utility in the preparation of adhesives and the like. Compositions of the condensation products of bisphenol A and epichlorohydrin together with monoepoxy compounds are described in detail in U.S. 2,528,932 to Wiles et al. Such compositions may be produced as a by-product of the crystallization process of this invention.

Monoepoxy compounds suitable for use as crystallization diluents in the process of this invention are those monoepoxy compounds of the Wiles et al. patent which have a viscosity from 0.5 to 10 centipoises at 25° C. A particularly preferred compound is n-butyl glycidyl ether. Other suitable compounds are: aromatic glycidyl ethers such as phenyl glycidyl ether; aliphatic glycidyl ethers such as methyl glycidyl ether, ethyl glycidyl ether, isopropyl glycidyl ether; and unsaturated aliphatic glycidyl ethers such as allyl glycidyl ether.

Several conditions affect the recovery of crystalline diglycidyl ether of bisphenol A. Particularly outstanding results are obtained when crystallization is carried out from a reaction product of bisphenol A and epichlorohydrin which contains at least about 90% by weight of the diglycidyl ether to which has been added from 8 to 15% by weight n-butyl glycidyl ether as a solvent. The mixture may be maintained without agitation and cooled to a temperature of 0 to 3° C. or it may be agitated. From 1 to 2% seed crystals of the diglycidyl ether are added to the solution when the crystallization temperature has been reached. The mixture is then maintained in the crystallization temperature range for about 1.5 to 2.5 days.

It will be apparent that useful results can be obtained outside the above ranges of conditions. However, solvent content should remain within the range from about 5 to 30% by weight of the total solution. With more viscous solvents the content is preferably in the upper part of that range and with less viscous solvents in the lower part. The amount of seed crystals added may be from 0.1% to 10%, but amounts in excess of about 2% are not generally of additional advantage. Crystallization temperatures may be in the range from 0° to 25° C., preferably between 0° to 10° C. The crystallization time may be varied in the range from 1 to 72 hours or more. It has been observed, however that the amount of crystals recovered reaches a maximum after a certain time, depending upon the conditions selected, and by holding the mixture at the same temperature for an additional period of time part of the crystalline material is redissolved so that the yield is actually decreased. It has also been found that this effect is substantially less significant with the solvents of this invention than with other solvents which have been heretofore employed.

The following examples illustrate some aspects of the present invention. The invention is not to be limited, however, to the illustrative examples but only by the appended claims.

*Example 1*

A condensation product of p,p'-bisphenol A and epichlorohydrin is prepared under controlled conditions yielding a total product containing 90% of the diglycidyl ether of p,p'-bisphenol A. To this product there is added 10% by weight of normal butyl glycidyl ether. The mixture is reduced to a temperature of 10° C.; 0.3% by weight of crystals of pure diglycidyl ether of p,p'-bisphenol A is added. The mixture is maintained at the low temperature for three days, resulting in a substantial yield of crystals of diglycidyl ether of p,p'-bisphenol A. The crystal yield is 66% by weight of the compound originally present.

*Example 2*

The procedure of Example 1 is repeated with exception that the amount of seed crystals added is 1.2% by weight and the crystallization time is reduced from 3 days to 1.5 days. The yield of crystals of pure diglycidyl ether of p,p'-bisphenol A is 69% by weight.

*Example 3*

The procedure of Example 1 is repeated with the difference that the condensation product used as the original feed contains only 82% by weight of the diglycidyl ether of p,p'-bisphenol A and the crystallization time is extended to seven days. The yield of crystals of pure diglycidyl ether of p,p'-bisphenol A is 49% by weight.

*Example 4*

To the same condensation product used in Example 3 there is added 20% by weight of normal butyl glycidyl ether. The temperature is reduced to 2.5° C.; 0.9% of crystals of the pure ether is added to the mixture, and it is held at the low temperature for six days. The yield of crystals of pure diglycidyl ether of p,p'-bisphenol A is 38% by weight.

*Example 5*

A condensation product of the same type used in Example 1, containing 90% by weight of the diglycidyl ether of p,p'-bisphenol A, is diluted with 50% by weight of a mixture of methyl isobutyl ketone and methyl isobutyl carbinol in a ratio which has been found to yield the best results possible with such a solvent. Portions of the resulting mixture are cooled to 2-5° C. To one portion is added 1% by weight of the crystals of the pure diglycidyl ether and to another portion 10% by weight of the crystals. The portions are held at the low temperature for two days. The yield of crystals of pure diglycidyl ether of p,p'-bisphenol A in each case is approximately 33% by weight.

*Example 6*

Crystals recovered according to Examples 1–4 were recovered by filtration from the mother liquor. A small amount of the n-butyl glycidyl ether was found to adhere to the crystals. This could be substantially completely washed off by means of a suitable solvent, e.g., methanol or n-hexane, resulting in free-flowing dry crystals.

The resulting crystals had a weight of 170 grams per epoxide grouping, a melting point of 43.5° C., a total chlorine content of approximately 0.03% by weight, a saponifiable chlorine content of less than 0.01%, a Gardner color of less than 1 and a viscosity at 25° C. of about 40 poises, when liquefied and supercooled.

*Example 7*

To 100 parts by weight of a condensation product of p,p'-bisphenol A and epichlorohydrin which contains 90% by weight of the diglycidyl ether of p,p'-bisphenol A there are added 10 parts by weight of n-butyl glycidyl ether. The mixture is cooled to a temperature in the range of 0° to 3° C. and 1.5 parts by weight of crystals of pure diglycidyl ether of p,p'-bisphenol A is added thereto. The seeded mixture is held at the low temperature for two days. The crystals are then removed from the mixture by filtration and are washed with two portions of 50 parts by weight of n-hexane. The treatment yields about 60 parts by weight of pure crystals of diglycidyl ether of p,p'-bisphenol A. The mother liquor removed in the filtration contains about 10 parts of n-butyl glycidyl ether, 30 parts of the diglycidyl ether of p,p'-bisphenol A and 10 parts of other condensation products. To this mother liquor there is added an additional 50 parts of the condensation product of p,p'-bisphenol A and epichlorohydrin. The resulting liquid is a suitable commercial resin for use as an adhesive in accordance with U.S. 2,528,932.

*Example 8*

Example 1 is repeated using instead of 10% n-butyl glycidyl ether 20% of phenyl glycidyl ether. A substantial yield of pure crystals of diglycidyl ether of p,p'-bisphenol A is obtained. Similarly good results are obtained when substituting 10 to 30% of methyl glycidyl ether, isopropyl glycidyl ether, and allyl glycidyl ether.

We claim as our invention:

1. The method of recovering crystalline 2,2-bis(2,3-epoxypropoxyphenyl)propane which comprises adding to a mixture resulting from the reaction of epichlorohydrin with 2,2-bis(4-hydroxyphenyl)propane, which contains in excess of 80% by weight of 2,2-bis(2,3-epoxypropoxyphenyl)propane, from 5 to 25% by weight of a liquid monoglycidyl ether of a hydrocarbon, having a viscosity in the range from 0.5 to 10 centipoises at 25° C., cooling the resulting mixture to a temperature at which crystallization takes place, maintaining the solution at a crystallization temperature until a substantial amount of crystallization has taken place and recovering crystals of pure 2,2-bis(2,3-epoxypropoxyphenyl)propane from the resulting crystal slurry.

2. A process according to claim 1 in which said monoglycidyl ether is n-butyl glycidyl ether.

3. The method of recovering crystalline 2,2-bis(2,3-epoxypropoxyphenyl)propane which comprises adding to a mixture resulting from the reaction of epichlorohydrin with 2,2-bis(4-hydroxyphenyl)propane, which contains at least about 90% by weight of 2,2-bis(2,3-epoxypropoxyphenyl)propane, from 8 to 15% by weight of n-butyl glycidyl ether, cooling the resulting mixture to a crystallization temperature in the range from 0° to 10° C., adding from 0.1 to 2% of seed crystals of 2,2-bis(2,3-epoxypropoxyphenyl)propane thereto, maintaining the solution at a crystallization temperature until a substantial amount of crystallization has taken place, recovering crystals from the resulting slurry, washing said crystals, and recovering free-flowing crystals of pure 2,2-bis(2,3-epoxypropoxyphenyl)propane.

4. A process according to claim 1 in which from 0.1 to 10% of seed crystals of 2,2-bis(2,3-epoxypropoxyphenyl)propane is added to said cooled mixture to initiate crystallization.

5. A process according to claim 4 in which said monoglycidyl ether is n-butyl glycidyl ether.

References Cited in the file of this patent

UNITED STATES PATENTS

| | | |
|---|---|---|
| 2,506,486 | Bender et al. | May 2, 1950 |
| 2,765,322 | Beavers | Oct. 2, 1956 |
| 2,805,170 | Bell | Sept. 3, 1957 |

OTHER REFERENCES

Weissberger: Technique of Organic Chem., volume III (1950), pages 363–485, (pages 366, 389, 394–8, 402–14, 471–82 relied on).

"Encyclopedia of Chemical Technology," volume 12, page 680 (1954).